(12) United States Patent
Aida et al.

(10) Patent No.: US 8,519,020 B2
(45) Date of Patent: Aug. 27, 2013

(54) NONAQUEOUS INKJET INK AND INK SET

(75) Inventors: Seiji Aida, Chuo-ku (JP); Ken Yamasaki, Chuo-ku (JP); Atsushi Yoda, Chuo-ku (JP); Kaori Nakano, Chuo-ku (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 281 days.

(21) Appl. No.: 12/446,355

(22) PCT Filed: Oct. 19, 2007

(86) PCT No.: PCT/JP2007/070454
§ 371 (c)(1), (2), (4) Date: Apr. 20, 2009

(87) PCT Pub. No.: WO2008/047912
PCT Pub. Date: Apr. 24, 2008

(65) Prior Publication Data
US 2010/0317775 A1    Dec. 16, 2010

(30) Foreign Application Priority Data
Oct. 20, 2006 (JP) .................................. 2006-286062

(51) Int. Cl.
*C09D 11/00* (2006.01)
(52) U.S. Cl.
USPC .............. 523/160; 524/490; 524/377; 524/95
(58) Field of Classification Search
USPC .................................................. 523/160, 161
See application file for complete search history.

(56) References Cited

U.S. PATENT DOCUMENTS

| | | | | |
|---|---|---|---|---|
| 5,610,306 A | * | 3/1997 | Maki et al. ...................... | 546/49 |
| 5,882,389 A | * | 3/1999 | Schwarz, Jr. ............... | 106/31.49 |
| 7,381,760 B2 | | 6/2008 | Aida et al. | |
| 2004/0266907 A1 | | 12/2004 | Sugita et al. | |
| 2007/0167538 A1 | * | 7/2007 | Mochizuki et al. ........... | 523/160 |
| 2008/0305261 A1 | * | 12/2008 | Deroover et al. ............. | 427/256 |

FOREIGN PATENT DOCUMENTS

| | | | |
|---|---|---|---|
| EP | 0 885 941 A1 | 12/1998 | |
| EP | 1 048 700 A1 | 11/2000 | |
| EP | 1 801 171 A1 | 6/2007 | |
| EP | 1 857 512 A1 | 11/2007 | |
| EP | 1 992 670 A1 | 11/2008 | |
| JP | 2000 515920 | 11/2000 | |
| JP | 2003 313462 | 11/2003 | |
| JP | 2005 105191 | 4/2005 | |
| JP | 2005 330298 | 12/2005 | |
| JP | 2006-9027 | * | 1/2006 |
| JP | 2006-9027 A | 1/2006 | |
| JP | 2006-37020 A | 2/2006 | |
| JP | 2007 169492 | 7/2007 | |
| JP | 2007-169492 A | 7/2007 | |
| WO | 2007 102285 | 9/2007 | |

OTHER PUBLICATIONS

Machine translation of JP 2006-9027.*
European Notice of Opposition Issued on Sep. 20, 2012 in Patent Application No. 07830188.4 with Appendix, Chinacridon-Pigmente, (http://de.wikipedia.org./w/index.php?oldid=90366128).
European Notice of Opposition Issued Sep. 4, 2012 in Patent Application No. 07830188.4.

* cited by examiner

*Primary Examiner* — Doris Lee
(74) *Attorney, Agent, or Firm* — Oblon, Spivak, McClelland, Maier & Neustadt, L.L.P.

(57) ABSTRACT

A non-aqueous ink jet which has less bad odor, has excellent safety and sanitariness, excellent resin dissolvability, excellent printing stability and excellent dryability, causes no corrosion of printers, and has good adhesiveness to non-absorbent substrates, and an ink set are provided. In the non-aqueous inkjet ink comprising a pigment, a resin and a mixed solvent, the mixed solvent comprises diethylene glycol dialkyl ether and tetraethylene glycol dialkyl ether.

15 Claims, No Drawings

NONAQUEOUS INKJET INK AND INK SET

CROSS-REFERENCE TO RELATED APPLICATIONS

This application is a 371 of PCT/JP07/070454 filed Oct. 19, 2007 and claims the benefit of JP 2006-286062 filed Oct. 20, 2006.

TECHNICAL FIELD

The present invention relates to a non-aqueous inkjet ink and an ink set.

BACKGROUND ART

As the printing methods suitable for non-absorbent substrates, gravure printing for soft packaging materials, flexographic printing for sanitary materials, silk screen printing for metal plates, inkjet printing for indoor and outdoor advertisement, and the like, are generally known. Ink compositions used for these printing methods generally make use of solvents being toxic and teratogenic, such as toluene, ethyl acetate, methyl ethyl ketone, methyl isobutyl ketone and cyclohexanone. These solvents have been difficult to handle, such as in terms of the specification of ambient concentration, installation of draft chamber due to unpleasant odor or the like, or occurrence of an obligation to take periodic health examinations. However, there has been a demand for an ink having higher safety and sanitariness. In particular, unlike the gravure printing, flexographic printing and silk screen printing, which are performed in dedicated factories, inkjet is used in general workplaces such as business offices, and therefore, more consideration should be taken with regard to safety, noxiousness and odor.

For an enhancement of safety, in regard to the gravure printing for flexible packaging materials and flexographic printing for sanitary materials, non-toluene inks which do not use toluene having a low set value for ambient concentration, or water-based inks which contain alcohol as a main component, have been developed.

Meanwhile, also in regard to the inkjet printing, an ink having no toxicity and teratogenicity, which utilizes a polyalkylene glycol-based solvent or a hydrocarbon-based solvent, has been developed (Patent Document 1). However, since such inks formed from polyalkylene glycol-based solvents or hydrocarbon-based solvents are not capable of dissolving the surface of printing substrates, there have been problems of having poor adhesion and weather resistance.

Thus, recently, a solvent-based inkjet ink having improved adhesion, weather resistance and the like, has been developed by using a nitrogen-containing heterocyclic compound such as 2-pyrrolidone or N-methyl-2-pyrrolidone, a sulfur-containing compound such as DMSO, or a lactone-based compound, which does not have toxicity and teratogenecity as is the case with polyalkylene glycol-based solvents, as an assistant solvent (Patent Document 1, Patent Document 2). However, since such an ink has strong dissolvability, there have been problems such as dissolution of pigments, corrosion of print head materials, and strong bad odor.

That is, there has been hitherto a demand for a non-aqueous inkjet ink which smells less, has excellent safety and sanitariness, excellent resin dissolvability, excellent printing stability and excellent dryability, causes no corrosion of printers, and has good adhesiveness to non-absorbent substrates.

Patent Document 1: Japanese Patent Application (Laid-Open) No. 2005-330298
Patent Document 2: Japanese Patent Application (Laid-Open) No. 2000-515920.

DISCLOSURE OF THE INVENTION

An aspect of the present invention relates to a non-aqueous inkjet ink comprising a pigment, a resin and a mixed solvent, wherein the mixed solvent comprises diethylene glycol dialkyl ether and tetraethylene glycol dialkyl ether.

The mixing ratio of the mixed solvent is preferably such that tetraethylene glycol dialkyl ether is in a proportion of 1 to 100 parts by weight relative to 100 parts by weight of diethylene glycol dialkyl ether.

The mixed solvent preferably comprises diethylene glycol diethyl ether and tetraethylene glycol dimethyl ether.

The ink preferably further comprises 1 to 20% by weight of N-alkyloxazolidinone.

The pigment preferably comprises one species selected from dimethylquinacridone, dichloroquinacridone and unsubstituted quinacridone.

Further, the ink preferably comprises a compound represented by the following formula (1):

$$Q\text{-}SO_3^-[NH_3\text{---}R]^+ \quad \text{Formula (1)}$$

wherein Q represents a quinacridone residue; and R represents an alkyl group having 5 to 20 carbon atoms.

Furthermore, another aspect of the present invention relates to a non-aqueous inkjet ink set which comprises a magenta ink comprising a pigment selected from dimethylquinacridone, dichloroquinacridone and unsubstituted quinacridone, and a mixed solvent diethylene glycol diethyl ether and tetraethylene glycol dimethyl ether, and a black ink, a cyan ink and a yellow ink each comprising a mixed solvent of diethylene glycol diethyl ether and N-alkyloxazolidinone.

It is preferable that the black ink, cyan ink and yellow ink further comprise tetraethylene glycol dimethyl ether as a mixed solvent.

It is preferable that the pigment of the black ink be carbon black, the pigment of the cyan ink be a copper phthalocyanine-based pigment, and the pigment of the yellow ink being a nickel azo complex pigment or a benzimidazole-based pigment.

According to one embodiment of the present invention, a non-aqueous ink jet which has less bad odor, has excellent safety and sanitariness, excellent resin dissolvability, excellent printing stability and excellent dryability, causes no corrosion of printers, and has good adhesiveness to non-absorbent substrates, and an ink set can be provided.

The present disclosure relates to subject matter contained in Japanese Patent Application No. 2006-286062 (filed on Oct. 20, 2006), the disclosure of which is expressly incorporated herein by reference in its entirety.

BEST MODE FOR CARRYING OUT THE INVENTION

The mixed solvent used in the present invention comprises diethylene glycol dialkyl ether and tetraethylene glycol dialkyl ether. None of these solvents corresponds to a CMR material (carcinogenic, mutagenic, and toxic to reproduction). The alkyl group of dialkyl ether of both the compounds preferably has 1 to 4 carbon atoms, and more preferably 1 or 2 carbon atoms. As a specific combination, a combination of diethylene glycol diethyl ether and tetraethylene glycol dimethyl ether is preferred.

The reasons why the combination of diethylene glycol dialkyl ether and tetraethylene glycol dialkyl ether is good, is because the balance between the dissolvability of polyvinyl chloride resin sheets, which are representative examples of non-absorbent substrate, and the volatility and dryability, is good. That is, while diethylene glycol dialkyl ether has nearly no or low dissolvability of polyvinyl chloride resin sheets, tetraethylene glycol dialkyl ether is very high dissolvability. Furthermore, the dryability is the opposite, and diethylene glycol dialkyl ether has high volatility, while tetraethylene glycol dialkyl ether has very low volatility. A combination which reflects this effect most favorably is a combination of diethylene glycol diethyl ether and tetraethylene glycol dimethyl ether as described above.

As for the mixing ratio of the mixed solvent, it is preferable that tetraethylene glycol dialkyl ether is in an amount of 1 to 100 parts by weight, more preferably 5 to 50 parts by weight, and even more preferably 10 to 40 parts by weight, relative to 100 parts by weight of diethylene glycol dialkyl ether.

Furthermore, in the case of taking safety and sanitariness into consideration, a combination of diethylene glycol diethyl ether and tetraethylene glycol dimethyl ether is very advantageous from the viewpoint of noxiousness such as acute toxicity, mutagenicity, carcinogenicity and toxicity to reproduction.

When N-alkyloxazolidinone is further added as a mixed solvent, the mixed solvent further dissolves the resin at the surface of a non-absorbent substrate, and thereby the adhesiveness to the non-absorbent substrate can be enhanced. The amount of addition is preferably 1 to 20% by weight, more preferably 1 to 10% by weight, and even more preferably 3 to 7% by weight, in the ink.

In regard to the pigment according to the present invention, various organic pigments and inorganic pigments can be used. The mixed solvent according to the present invention has very good compatibility with quinacridone pigments, which are conventionally used as raw materials for magenta inks. Unlike other pigments, quinacridone-based pigments have a tendency of being dissoluble in organic solvents in a trace amount. For that reason, in the case that quinacridone-based pigments are used in inkjet inks, unnecessary materials resulting from recrystallization of the pigment may adhere to the inside of inkjet print heads, thus bringing about nozzle clogging. However, the tetraethylene glycol dialkyl ether which is contained in the ink of the present invention as a solvent, dissolves non-absorbent substrates, but does not dissolve quinacridone-based pigments, thus causing no nozzle clogging. Therefore, tetraethylene glycol dialkyl ether is suitable as a solvent for magenta ink. Examples of the quinacridone-based pigment include dimethylquinacridone, dichloroquinacridone and unsubstituted quinacridone, but preferred are dimethylquinacridone and unsubstituted quinacridone, while more preferred is dimethylquinacridone.

In the case where a quinacridone-based pigment is used in magenta inks, it is desirable to add a compound represented by the following formula (1) in order to render the dispersion stability of the pigment good:

$$Q\text{-}SO_3^-[NH_3\text{---}R]^+ \qquad \text{Formula (1)}$$

wherein Q represents a quinaridone residue; and R represents an alkyl group having 5 to 20 carbon atoms.

The amount of addition of this compound is preferably 1 to 20 parts by weight, more preferably 1 to 10 parts, and even more preferably 3 to 7 parts, relative to 100 parts by weight of the pigment. R in the compound represents an alkyl group. The alkyl group preferably has 5 to 20, more preferably 5 to 15, and even more preferably 10 to 15, carbon atoms. Here, it is effective to add this compound at the time of dispersing the pigment, but the pigment may also be treated in advance using this compound. Furthermore, this compound has higher dissolubility in organic solvents compared to the aforementioned quinacridone-based pigments, but adhesion of unnecessary substances to the inside of print heads can be prevented according to the mixed solvent of the present invention.

Furthermore, it is also desirable to have an inkjet ink set by combining a plurality of inkjet inks. As the inkjet ink set, a magenta ink, a black ink, a cyan ink and a yellow ink may be combined. As for the inkjet ink set, in case that the magenta ink comprises one species selected from dimethylquinacridone, dichloroquinacridone and unsubstituted quinacridone, and a mixed solvent of diethylene glycol diethyl ether and tetraethylene glycol dimethyl ether, the black ink, cyan ink and yellow ink comprises a mixed solvent of diethylene glycol diethyl ether and N-alkyloxazolidinone, respectively.

In order to further control the balance of dryability or the adhesiveness to non-absorbent substrates, it is preferable to add tetraethylene glycol dimethyl ether to the black ink, cyan ink and yellow ink, respectively. The amount of addition is pursuant to the descriptions given thus far.

The mixed solvent in the non-aqueous ink jet ink of the present invention is preferably in an amount of 60% by weight to 95% by weight, more preferably 70% by weight to 95% by weight, and even more preferably 80% by weight to 95% by weight, of the total amount of ink. Of course, solvents other than the mixed solvent can also be added for viscosity adjustment or for the regulation of dryability. The solvent that can be added is not particularly limited, but examples thereof will be given below.

Glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate; glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol dibutyrate, diethylene glycol acetate propionate, diethylene glycol acetate butyrate, diethylene glycol propionate butyrate, diethylene glycol dipropionate, diethylene glycol dibutyrate, propylene glycol acetate propionate, propylene glycol acetate butyrate, propylene glycol propionate butyrate, propylene glycol dipropionate, propylene glycol dibutyrate, dipropylene glycol acetate propionate, dipropylene glycol acetate butyrate, dipropylene glycol propionate butyrate, dipropylene glycol dipropionate, and dipropylene glycol dibutyrate; glycols such as ethylene glycol, diethylene glycol, triethylene glycol, propylene glycol, and dipropylene glycol; glycol ethers such as ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; and lactic esters such as methyl lactate, ethyl lactate, propyl lactate and butyl lactate, may be exemplified.

The pigment that is to be used in the inks other than the magenta ink of the present invention, is not particularly limited, but as for the black ink, carbon black is good, and any of acidic, neutral and basic carbon blacks can be used. As for the cyan ink, copper phthalocyanine pigments are good, and C.I. Pigment Blue 15, 15:1, 15:2, 15:3 and 15:4, as indicated according to the Color Index, are preferred. As for the yellow ink, nickel-azo complex pigments or benzimidazole-based pigments are good, while C.I. Pigment Yellow 150, 151, 154, 180 and 213, as indicated according to the Color Index, are good. Furthermore, these pigments are preferably contained in the inks in a proportion of 0.1 to 10% by weight.

In the present invention, a resin is added to enhance the adhesiveness to non-absorbent substrates. As the resin that can be used, an acrylic resin, a styrene-acryl-based resin, a styrene-maleic acid-based resin, a rosin-based resin, a rosin ester-based resin, an ethylene-vinyl acetate resin, a petroleum resin, a coumarone-indene-based resin, a terpene-phenol-based resin, a phenolic resin, a urethane resin, a melamine resin, a urea resin, an epoxy-based resin, a cellulose-based resin, a vinyl chloride-vinyl acetate-based resin, a xylene resin, an alkyd resin, an aliphatic hydrocarbon resin, a butyral resin, a maleic acid resin, a fumaric acid resin, and the like are exemplified. Specific examples of the resin include Super Ester 75, Ester gum HP and Malkyd 33, manufactured by Arakawa Chemical Industries, Ltd.; YS Polyster T80 manufactured by Yasuhara Chemical Co., Ltd.; Hiretts HRT200X manufactured by Mitsui Chemicals, Inc.; Johncryl 586 (styrene-acrylic acid copolymer) manufactured by BASF Corp.; UCAR solution vinyl resins VYHD, VYHH, YMCA, VROH and VYLF-X, manufactured by Dow Chemical Company; and Solbine resins CL, CNL, C5R and TA5R, manufactured by Nisshin Chemical Industries, Ltd. The resin is preferably contained in the ink in a proportion of 0.1 to 10% by weight.

In the present invention, a dispersant can be added to enhance the dispersibility of pigments and the storage stability of inks. As for the dispersant, a hydroxyl group-containing carboxylic acid ester, a salt of a long chain polyaminoamide and a high molecular weight acid ester, a salt of a high molecular weight polycarboxylic acid ester, a salt of a long chain polyaminoamide and a polar acid ester, a high molecular weight unsaturated acid ester, a high molecular weight copolymer, a modified polyurethane, a modified polyacrylate, a polyether ester type anionic active agent, a naphthalenesulfonic acid-formalin condensate salt, an aromatic sulfonic acid-formalin condensate salt, a polyoxyethylene alkylphosphoric acid ester, a polyoxyethylene nonylphenyl ether, a stearylamine acetate and the like may be exemplified.

Specific examples of the dispersant include "Anti-Terra-U (polyaminoamide phosphoric acid salt)", "Anti-Terra-203/204 (high molecular weight polycarboxylic acid salt)", "Disperbyk-101 (polyaminoamide phosphoric acid salt and acid ester), 107 (hydroxyl group-containing carboxylic acid ester), 110, 111 (copolymer containing an acidic group), 130 (polyamide), 161, 162, 163, 164, 165, 166, 170 (high molecular weight copolymer)", "400", "Bykumen" (high molecular weight unsaturated acid ester), "BYK-P104, P105 (high molecular weight unsaturated acid polycarboxylic acid)", "P104S, 240S (high molecular weight unsaturated acid polycarboxylic acid and silicone type)", and "Lactimon (long chain amine, unsaturated acid polycarboxylic acid and silicone)", manufactured by BYK Japan KK.

There may also be exemplified "Efka 44, 46, 47, 48, 49, 54, 63, 64, 65, 66, 71, 701, 764, 766", "Efkapolymer 100 (modified polyacrylate), 150 (aliphatically modified polymer), 400, 401, 402, 403, 450, 451, 452, 453 (modified polyacrylate), 745 (copper phthalocyanine type)", manufactured by Efka Chemicals; "Flowlen TG-710 (urethane oligomer)", "Flownon SH-290, SP-1000", "Polyflow No. 50E, No. 300 (acrylic copolymer)", manufactured by Kyoeisha Chemical Co., Ltd.; "Disparlon KS-860, 873SN, 874 (high molecular weight dispersant), #2150 (aliphatic polyvalent carboxylic acid) and #7004 (polyether ester type)", manufactured by Kusumoto Chemicals, Ltd.

Furthermore, there may be exemplified "Demol RN, N (naphthalenesulfonic acid-formalin condensate sodium salt), MS, C, SN-B (aromatic sulfonic acid-formalin condensate sodium salt), EP", "Homogenol L-18 (polycarboxylic acid type polymer)", "Emulgen 920, 930, 931, 935, 950, 985 (polyoxyethylene nonyl phenyl ether)", "Acetamin 24 (coconut amine acetate), 86 (stearylamine acetate)", manufactured by Kao Corp.; "Solsperse 5000 (phthalocyanine ammonium salt type), 13940 (polyester amine type), 17000 (fatty acid amine type), 24000", manufactured by Lubrizol Corp.; "Nikkol T106 (polyoxyethylene sorbitanmonooleate), MYS-IEX (polyoxyethylene monostearate), Hexagline 4-0 (hexaglyceryl tetraoleate)", manufactured by Nikko Chemicals Co., Ltd.; and "Ajisper PB821, PB822 (basic dispersant)", manufactured by Ajinomoto Fine-Techno Co., Inc. The dispersant is preferably contained in the ink in a proportion of 0.1 to 10% by weight.

In the ink of the present invention, various additives such as, for example, a plasticizer, a surface conditioning agent, an ultraviolet radiation inhibitor, a photostabilizer, an antioxidant, and a hydrolysis inhibitor, can be used.

As the medium suitable for printing with the ink of the present invention, non-absorbent substrates may be exemplified. Specific examples of the substrates include polyvinyl chloride resin sheets, polyolefin-based sheets, glass, metals and the like, and particularly preferably, polyvinyl chloride resin sheets can be exemplified.

The ink of the present invention may also be prepared by, first, initially dispersing a pigment together with a resin or a dispersant in a single solvent or a mixed solvent by means of a pain shaker, a sand mill, a roll mill, a medialess disperser or the like, and diluting the resulting pigment dispersion with a solvent or the like to obtain the mixture of the present invention.

EXAMPLES

Hereinafter, the present invention will be specifically described by way of Examples, but is not particularly limited to the Examples. In the Examples, the term "parts" represents "parts by weight."

<Pigment Dispersion A>

First, a pigment dispersion A was produced at the following composition. This dispersion was prepared by introducing a pigment and a dispersant into a solvent, stirring the mixture with a high speed mixer until the mixture became homogeneous, and then dispersing the resulting mill base with a horizontal sand mill for about 2 hours.

YELLOW PIGMENT E4GN (manufactured by Lanxess KK, nickel-azo complex pigment) 37.0 parts AJISPER PB821 (manufactured by Ajinomoto Fine-Techno Co., Inc., pigment dispersant) 18.0 parts
Diethylene glycol diethyl ether 45.0 parts
<Pigment Dispersion B>

Furthermore, a pigment dispersion B was produced at the following composition. This dispersion was prepared by introducing a pigment, "compound a" represented by the following formula (1), in which R is an alkyl group having 12 carbon atoms, and a dispersant into a solvent, stirring the mixture with a high speed mixer until the mixture became homogeneous, and dispersing the resulting mill base with a horizontal sand mill for about 2 hours.

$$Q\text{-}SO_3^-[NH_3\text{—}R]^+ \qquad \text{Formula (1)}$$

wherein Q represents a quinacridone residue; and R represents an alkyl group having 5 to 20 carbon atoms.

CROMOPHTAL PINK PT (manufactured by Ciba Specialty Chemicals Corp., dimethylquinacridone pigment) 30.0 parts
"Compound a" 1.5 parts
SOLSPERSE 32000 (manufactured by Lubrizol Corp., pigment dispersant) 15.0 parts
Diethylene glycol diethyl ether 53.5 parts
<Pigment Dispersion C>

A pigment dispersion C was produced at the following composition. This dispersion was prepared by introducing a pigment and a dispersant into a solvent, stirring the mixture with a high speed mixer until the mixture became homogeneous, and then dispersing the resulting mill base with a horizontal sand mill for about 1 hour.

LIONOL BLUE FG-7400-G (manufactured by Toyo Ink Manufacturing Co., Ltd., copper phthalocyanine pigment) 40.0 parts
AJISPER PB821 (manufactured by Ajinomoto Fine-Techno Co., Inc., pigment dispersant) 14.0 parts
Diethylene glycol diethyl ether 46.0 parts
<Pigment Dispersion D>

A pigment dispersion D was produced at the following composition. This dispersion was prepared by introducing a pigment and a dispersant into a solvent, stirring the mixture with a high speed mixer until the mixture became homogeneous, and then dispersing the resulting mill base with a horizontal sand mill for about 1 hour and 30 minutes.

REGAL 400R (manufactured by Cabot Corp., carbon black pigment) 42.0 parts
SOLSPERSE 17000 (manufactured by Lubrizol Corp., pigment dispersant) 14.7 parts
Diethylene glycol diethyl ether 43.3 parts
<Pigment Dispersion E>

A pigment dispersion E was produced at the following composition. This dispersion was prepared by introducing a pigment and a dispersant into a solvent, stirring the mixture with a high speed mixer until the mixture became homogeneous, and then dispersing the resulting mill base with a horizontal sand mill for about 2 hours.

LIONOL BLUE FG-7400-G (manufactured by Toyo Ink Manufacturing Co., Ltd., copper phthalocyanine pigment) 40.0 parts
AJISPER PB821 (manufactured by Ajinomoto Fine-Techno Co., Inc., pigment dispersant) 14.0 parts
Diethylene glycol methyl ethyl ether 46.0 parts
<Pigment Dispersion F>

A pigment dispersion F was produced at the following composition. This dispersion was prepared by introducing a pigment and a dispersant into a solvent, stirring the mixture with a high speed mixer until the mixture became homogeneous, and then dispersing the resulting mill base with a horizontal sand mill for about 2 hours.

YELLOW PIGMENT E4GN (manufactured by Lanxess KK, nickel-azo complex pigment) 37.0 parts
SOLSPERSE 32000 (manufactured by Lubrizol Corp., pigment dispersant) 20.0 parts
Diethylene glycol dibutyl ether 43.0 parts Example 1

The following composition was mixed and filtered through a polypropylene 1 μm filter, to produce a yellow inkjet ink.
Pigment dispersion A 10.8 parts
VYHD (manufactured by Dow Chemical Company, copolymer of vinyl chloride and vinyl acetate) 6.5 parts
BYK-361N (manufactured by BYK Japan KK, surface conditioning agent) 0.5 parts
Tetraethylene glycol dimethyl ether 15.0 parts
N-methyloxazolidinone 5.0 parts
Diethylene glycol diethyl ether 62.2 parts Example 2

The following composition was mixed and filtered through a polypropylene 1 μm filter, to produce a magenta inkjet ink.
Pigment dispersion B 16.7 parts
VYHD (manufactured by Dow Chemical Company, copolymer of vinyl chloride and vinyl acetate) 5.5 parts
BYK-361N (manufactured by BYK Japan KK, surface conditioning agent) 0.5 parts
Tetraethylene glycol dimethyl ether 20.0 parts
Diethylene glycol diethyl ether 57.3 parts Example 3

The following composition was mixed and filtered through a polypropylene 1 μm filter, to produce a cyan inkjet ink.
Pigment dispersion C 10.0 parts
VYHD (manufactured by Dow Chemical Company, copolymer of vinyl chloride and vinyl acetate) 6.7 parts
BYK-361N (manufactured by BYK Japan KK, surface conditioning agent) 0.5 parts
Tetraethylene glycol dimethyl ether 10.0 parts
N-methyloxazolidinone 4.5 parts
Diethylene glycol diethyl ether 68.3 parts Example 4

The following composition was mixed and filtered through a polypropylene 1 μm filter, to produce a black inkjet ink.
Pigment dispersion D 11.9 parts
VMCA (manufactured by Dow Chemical Company, terpolymer of vinyl chloride, vinyl acetate and maleic acid) 6.0 parts
BYK-361N (manufactured by BYK Japan KK, surface conditioning agent) 0.5 parts
Tetraethylene glycol dimethyl ether 20.0 parts
N-methyloxazolidinone 4.5 parts
Diethylene glycol diethyl ether 57.1 parts Example 5

The following composition was mixed and filtered through a polypropylene 1 μm filter, to produce a cyan inkjet ink.
Pigment dispersion E 10.0 parts
VYHD (manufactured by Dow Chemical Company, copolymer of vinyl chloride and vinyl acetate) 4.2 parts J586 (manufactured by BASF Corp., styrene-acrylic acid copolymer) 2.0 parts
BYK-361N (manufactured by BYK Japan KK, surface conditioning agent) 0.5 parts
Tetraethylene glycol dimethyl ether 15.0 parts
N-methyloxazolidinone 5.0 parts
Diethylene glycol methyl ethyl ether 63.3 parts Example 6

The following composition was mixed and filtered through a polypropylene 1 μm filter, to produce a yellow inkjet ink.
Pigment dispersion F 10.8 parts
VMCA (manufactured by Dow Chemical Company, terpolymer of vinyl chloride, vinyl acetate and maleic acid) 5.9 parts
BYK-361N (manufactured by BYK Japan KK, surface conditioning agent) 0.5 parts
Tetraethylene glycol dimethyl ether 20.0 parts
N-methyloxazolidinone 5.0 parts
Diethylene glycol dibutyl ether 57.8 parts Example 7

The following composition was mixed and filtered through a polypropylene 1 μm filter, to produce a yellow inkjet ink.
Pigment dispersion A 10.8 parts
VYHD (manufactured by Dow Chemical Company, copolymer of vinyl chloride and vinyl acetate) 5.2 parts
BYK-361N (manufactured by BYK Japan KK, surface conditioning agent) 0.5 parts
Tetraethylene glycol dimethyl ether 23.0 parts
Diethylene glycol diethyl ether 57.8 parts Comparative Example 1

The following composition was mixed and filtered through a polypropylene 1 μm filter, to produce a yellow inkjet ink.
Pigment dispersion A 10.8 parts
VYHD (manufactured by Dow Chemical Company, copolymer of vinyl chloride and vinyl acetate) 5.0 parts
BYK-361N (manufactured by BYK Japan KK, surface conditioning agent) 0.5 parts
Triethylene glycol dimethyl ether 20.0 parts
Diethylene glycol diethyl ether 63.7 parts Comparative Example 2

The following composition was mixed and filtered through a polypropylene 1 μm filter, to produce a magenta inkjet ink.
Pigment dispersion B 16.7 parts
VYHD (manufactured by Dow Chemical Company, copolymer of vinyl chloride and vinyl acetate) 5.6 parts
BYK-361N (manufactured by BYK Japan KK, surface conditioning agent) 0.5 parts
N-methyloxazolidinone 5.0 parts
Diethylene glycol diethyl ether 72.2 parts Comparative Example 3

The following composition was mixed and filtered through a polypropylene 1 μm filter, to produce a cyan inkjet ink.
Pigment dispersion C 10.0 parts
VYHD (manufactured by Dow Chemical Company, copolymer of vinyl chloride and vinyl acetate) 5.0 parts
BYK-361N (manufactured by BYK Japan KK, surface conditioning agent) 0.5 parts
Diethylene glycol diethyl ether 84.5 parts Comparative Example 4

The following composition was mixed and filtered through a polypropylene 1 μm filter, to produce a black inkjet ink.
Pigment dispersion D 11.9 parts
VYHD (manufactured by Dow Chemical Company, copolymer of vinyl chloride and vinyl acetate) 4.3 parts
BYK-361N (manufactured by BYK Japan KK, surface conditioning agent) 0.5 parts
Tetraethylene glycol monobutyl ether 20.0 parts
Diethylene glycol diethyl ether 63.3 parts Comparative Example 5

The following composition was mixed and filtered through a polypropylene 1 μm filter, to produce a yellow inkjet ink.
Pigment dispersion A 10.8 parts
VYHD (manufactured by Dow Chemical Company, copolymer of vinyl chloride and vinyl acetate) 5.9 parts
BYK-361N (manufactured by BYK Japan KK, surface conditioning agent) 0.5 parts
Triethylene glycol dimethyl ether 20.0 parts
N-methyloxazolidinone 4.5 parts
Diethylene glycol diethyl ether 58.3 parts Example 8

Next, the magenta ink of Example 2, the black ink of Example 4, the cyan ink of Example 3, and the yellow ink of Example 1 were combined to produce a non-aqueous inkjet ink set. Specifically, 5 ml each of the respective inks were injected into a cartridge, and this was used as a non-aqueous inkjet ink set for inkjet printer.

The inkjet inks produced in Examples 1 to 7 and Comparative Examples 1 to 5 were evaluated by the methods as described below. The evaluation results are presented in Table 1.

<Odor>

Each of the inkjet inks was coated on a polyvinyl chloride resin sheet with untreated surface, using a No. 6 wire bar (manufactured by Toyo Seiki Seisaku-sho, Ltd.) in a constant temperature constant moisture chamber at 25° C. and 30% humidity. Immediately after the coating, a sensory test of odor was performed with randomly selected 20 people. The assessment was carried out with 20 people, such that the case where 0 to 5 people perceived an unpleasant odor was rated VG (Very Good); the case where 6 to 10 people perceived an unpleasant odor was rated G (Good); the case where 11 to 15 people perceived an unpleasant odor was rated B (Bad); and the case where 16 to 20 people perceived an unpleasant odor was rated VB (Very Bad).

<Storage Stability>

In regard to the viscosity of the respective inkjet inks, the inks were heated for four weeks at 70° C. in an oven, and then an evaluation was carried out using an E-type viscometer (manufactured by Toki Sangyo Co., Ltd.). The assessment was such that the case where the rate of change in the viscosity was less than 5% was rated VG (Very Good); the case where the rate of change was 5% or more and less than 10% was rated G (Good); the case where the rate of change was 10% or more and less than 15% was rated B (Bad); and the case where the rate of change was 15% or more was rated VB (Very Bad).

<Printing Stability>

For the respective inkjet inks, printing was performed continuously on a polyvinyl chloride resin sheet with untreated surface, using IP-6600 (manufactured by Seiko I Infotech, Inc., wideformat inkjet printer) in an environment at 25° C., and frequency of nozzle clogging or miss firing was evaluated. In a continuous printing test for 50 hours, the assessment was such that the case where the occurrence of missing dots, flying bend or ink splatter counted fewer than 5 times was rated VG (Very Good); the case where the occurrence counted 5 times or more and fewer than 10 times was rated G (Good); the case where the occurrence counted 10 times or more and fewer than 20 times was rated B (Bad); and the case where the occurrence counted 20 times or more was rated VB (Very Bad).

surface partially peeled off was rated B (Bad); and the case where the printed surface peeled off and the substrate was completely exposed was rated VB (Very Bad).

<Safety>

For the constituent raw materials of the respective inkjet inks, it was verified whether or not the inks contained so-called CMR substances, which are mutagenic, carcinogenic or toxic to reproduction. The assessment was such that the case where the ink did not contain any of such substances was rated VG (Very Good); and the case where the ink contained even one such substance was rated VB (Very Bad).

TABLE 1

|  | Ex. 1 | Ex. 2 | Ex. 3 | Ex. 4 | Ex. 5 | Ex. 6 | Ex. 7 | Com. Ex. 1 | Com. Ex. 2 | Com. Ex. 3 | Com. Ex. 4 | Com. Ex. 5 |
|---|---|---|---|---|---|---|---|---|---|---|---|---|
| Dispersant | A | B | C | D | E | F | A | A | B | C | D | A |
| Resin | VYHD | VYHD | VYHD | VMCA | VYHD J586 | VMCA | VYHD | VYHD | VYHD | VYHD | VYHD | VYHD |
| Additive | 361N | 361N | 361N | 361N | 361N | 361N | 361N | 361N | 361N | 361N | 361N | 361N |
| Solvent | DEGDE | DEGDE | DEGDE | DEGDE | DEGMEE | DEGDB | DEGDE | DEGDE | DEGDE | DEGDE | DEGDE | DEGDE |
|  | TEGDM | TEGDM | TEGDM | TEGDM | TEGDM | TEGDE | TEGDM | TriEGDM | — | — | TEGMB | TriEGDM |
|  | MOZ | — | MOZ | MOZ | MOZ | MOZ | — | — | MOZ | — | — | MOZ |
| Odor | G | VG | G | G | G | G | VG | B | G | G | G | B |
| Storage stability | VG | VG | VG | VG | G | G | VG | G | VB | VB | VB | G |
| Printing stability | VG | VG | VG | VG | G | G | VG | B | VB | VB | VB | G |
| Drivability | VG | G | VG | VG | G | G | G | G | G | VG | VB | G |
| Adhesiveness | VG | VG | VG | VG | G | G | VG | B | VG | VB | VB | VG |
| Safety | VG | VG | VG | VG | VG | VG | VG | VB | VG | VG | VG | VB |

TEGDM: Tetraethylene glycol dimethyl ether
TriEGDM: Triethylene glycol dimethyl ether
DEGDE: Diethylene glycol diethyl ether
DEGMEE: Diethylene glycol methyl ethyl ether
DEGDB: Diethylene glycol dibutyl ether
TEGMB: Tetraethylene glycol monobutyl ether
MOZ: N-methyloxazolidinone <Dryability>

For the respective inkjet inks, solid printing was performed on a polyvinyl chloride resin sheet with untreated surface, using IP-6600 (manufactured by Seiko I Infotech, Inc., wide-format inkjet printer) in an environment at 25° C., and the time taken by the ink to dry at 40° C. was measured. The assessment was such that the case where drying was completed in a time shorter than 2 minutes was rated VG (Very Good); the case where drying was completed in a time of 2 minutes or longer and shorter than 3 minutes was rated G (Good); the case where drying was completed in a time of 3 minutes or longer and shorter than 5 minutes was rated B (Bad); and the case where drying required 5 minutes or longer was rated VB (Very Bad).

<Adhesiveness>

For the respective inkjet inks, solid printing was performed on a polyvinyl chloride resin sheet with untreated surface, using IP-6600 (manufactured by Seiko I Infotech, Inc., wide-format inkjet printer) in an environment at 25° C., and the printed surfaces were subjected to an evaluation of adhesiveness using a rubbing tester (manufactured by Tester Sangyo Co., Ltd., Model AB301). As for the assessment criteria, 50 reciprocated rubbings were performed with a test cloth specimen (kanakin No. 3) under a load of 200 g, and the assessment was such that the case where the coated surface did not peel off at all was rated VG (Very Good); the case where the test cloth specimen was colored but the printed surface did not peel off was rated G (Good); the case where the printed According to Examples 1 to 7, there were obtained inkjet inks which have less bad odor and excellent storage stability, which do not corrode printer heads and have excellent printing stability as shown from the results of the stability test, which have excellent printing suitability as shown from the results of the dryability test, which have excellent resin dissolvability and adhesiveness to non-absorbent substrates as shown from the results of the adhesiveness test, and which have high safety and sanitariness. On the other hand, according to Comparative Examples 1 to 5, the results were very poor in terms of a plurality of items.

It will be understood that the matters discussed in the above are only intended to define preferred exemplary embodiments of the present invention, and that all of the modifications and corrections of the Examples mentioned in this disclosure are intended to be protected without departing from the spirit and the scope of the invention.

The invention claimed is:

1. A non-aqueous inkjet ink, comprising a pigment, a resin and a mixed solvent, wherein the mixed solvent comprises diethylene glycol dialkyl ether and tetraethylene glycol dialkyl ether, wherein the mixed solvent of diethylene glycol dialkyl ether and tetraethylene glycol dialkyl ether is in an amount of 80 to 95% by weight of the total amount of the inkjet ink, wherein the mixing ratio of the mixed solvent is that tetraethylene glycol dialkyl ether is in a proportion of 1 to 100 parts by weight relative to 100 parts by weight of diethylene glycol dialkyl ether.

2. The non-aqueous inkjet ink according to claim 1, wherein the mixed solvent comprises diethylene glycol diethyl ether and tetraethylene glycol dimethyl ether.

3. The non-aqueous inkjet ink according to claim 1, further comprising 1 to 20% by weight of N-alkyloxazolidinone.

4. The non-aqueous inkjet ink according to claim 1, wherein the pigment is selected from the group consisting of dimethylquinacridone, dichloroquinacridone and unsubstituted quinacridone.

5. The non-aqueous inkjet ink according to claim 1, wherein the mixing ratio of the mixed solvent is that tetraethylene glycol dialkyl ether is in a proportion of 5 to 50 parts by weight relative to 100 parts by weight of diethylene glycol dialkyl ether.

6. The non-aqueous inkjet ink according to claim 1, wherein the mixing ratio of the mixed solvent is that tetraethylene glycol dialkyl ether is in a proportion of 10 to 40 parts by weight relative to 100 parts by weight of diethylene glycol dialkyl ether.

7. A non-aqueous inkjet ink set, which comprises
the inkjet ink according to claim 1 as a magenta ink,
a black ink, a cyan ink and a yellow ink each comprising a mixed solvent of diethylene glycol diethyl ether and N-alkyloxazolidinone.

8. The non-aqueous inkjet ink set according to claim 7, wherein the black ink, cyan ink and yellow ink further comprise tetraethylene glycol dimethyl ether as the mixed solvent.

9. The non-aqueous inkjet ink set according to claim 7, wherein a pigment of the black ink is carbon black, a pigment of the cyan ink is a copper phthalocyanine pigment, and a pigment of the yellow ink is a nickel azo complex pigment or a benzimidazole pigment.

10. A non-aqueous inkjet ink, comprising a pigment, a resin, a mixed solvent, and a compound represented by the following formula (1):

$$Q-SO_3^-[NH_3-R]^+ \qquad \text{Formula (1)}$$

wherein Q represents a quinacridone residue; and R represents an alkyl group having 5 to 20 carbon atoms,
wherein the mixed solvent comprises diethylene glycol dialkyl ether and tetraethylene glycol dialkyl ether, wherein the mixed solvent of diethylene glycol dialkyl ether and tetraethylene glycol dialkyl ether is in an amount of 80 to 95% by weight of the total amount of the inkjet ink; and
wherein the pigment is selected from the group consisting of dimethylquinacridone, dichloroquinacridone and unsubstituted quinacridone.

11. The non-aqueous inkjet ink according to claim 10, wherein the mixed solvent comprises diethylene glycol diethyl ether and tetraethylene glycol dimethyl ether.

12. The non-aqueous inkjet ink according to claim 10, further comprising 1 to 20% by weight of N-alkyloxazolidinone.

13. A non-aqueous inkjet ink set, which comprises
the inkjet ink according to claim 10 as a magenta ink, a black ink, a cyan ink and a yellow ink each comprising a mixed solvent of diethylene glycol diethyl ether and N-alkyloxazolidinone.

14. The non-aqueous inkjet ink set according to claim 13, wherein the black ink, cyan ink and yellow ink further comprise tetraethylene glycol dimethyl ether as the mixed solvent.

15. The non-aqueous inkjet ink set according to claim 13, wherein a pigment of the black ink is carbon black, a pigment of the cyan ink is a copper phthalocyanine pigment, and a pigment of the yellow ink is a nickel azo complex pigment or a benzimidazole pigment.

* * * * *